United States Patent [19]
Elliott et al.

[11] Patent Number: 5,201,499
[45] Date of Patent: Apr. 13, 1993

[54] FABRIC REINFORCED STIFFENER FOR AIR SPRINGS

[75] Inventors: Robert F. Elliott, Westfield; Phyllis S. Woodrum; Michael E. Leakey, both of Noblesville, all of Ind.

[73] Assignee: Bridgestone/Firestone, Inc., Akron, Ohio

[21] Appl. No.: 751,412

[22] Filed: Aug. 28, 1991

[51] Int. Cl.$^5$ .................... F16F 9/04; B60G 11/62
[52] U.S. Cl. .................... 267/64.27; 267/64.23; 267/35; 152/559
[58] Field of Search ............... 267/64.19, 64.21, 64.23, 267/64.24, 64.27, 35; 152/526, 535, 538, 548, 559, 558

[56] References Cited

U.S. PATENT DOCUMENTS

| | | | |
|---|---|---|---|
| 2,920,885 | 1/1960 | Niclas | 267/64.27 |
| 2,996,103 | 8/1961 | Hollis et al. | 156/478 |
| 3,034,557 | 5/1962 | Beckadolph | 152/526 X |
| 3,043,582 | 7/1962 | Hirtreiter | 267/64.27 |
| 3,319,952 | 5/1967 | Travers | 267/64.27 |
| 3,666,598 | 5/1972 | Christie et al. | 156/361 |
| 3,780,782 | 12/1973 | Jennings et al. | 152/559 X |
| 3,897,941 | 8/1975 | Hirtreiter et al. | 267/64.24 |
| 4,174,827 | 11/1979 | Hirtreiter et al. | 267/64.27 |
| 4,763,883 | 8/1988 | Crabtree | 267/64.27 |

FOREIGN PATENT DOCUMENTS

0004403 1/1985 Japan .................... 152/559

Primary Examiner—Douglas C. Butler
Assistant Examiner—Josie A. Ballato
Attorney, Agent, or Firm—David A. Thomas

[57] ABSTRACT

An spring has a pair of axially spaced end members and an intervening bellows. The bellows includes inner and outer elastomeric body plies, each containing cords biased at generally opposite angles with respect to each other, such as 34½°. A pair of reinforcing strips of elastomeric coated cords are located between the inner and outer body plys. The cords of the reinforcing strips are biased in opposite directions with respect to each other and in opposite directions with respect to the cords of the body plies adjacent thereto. Furthermore, the cords of the reinforcing strips are between 2° and 6° less than the bias angles of the body ply cords. The reinforcing strips extend from adjacent the peripheral sealing edge of one of the end members a distance of between 2 inches and 6 inches, or generally less than one-fourth the axial separation of the end members, and stiffens the one end of the bellows to prevent the bellows from rolling over the peripheral edge of the one end member.

16 Claims, 3 Drawing Sheets

FABRIC REINFORCED STIFFENER FOR AIR SPRINGS

BACKGROUND OF THE INVENTION

1. Technical Field

The invention relates to the art of fluid pressure devices, and more particularly, to an air spring formed of a tubular elastomeric sleeve or bellows wherein one end of the bellows is reinforced with elastomeric strips containing biased reinforcing cords to stabilize the air spring and prevent the bellows from rolling over the end closure.

2. Background Information

Air springs are well known in the art and comprise an elastomeric sleeve or bellows which is maintained between a pair of end members, one of which is usually a piston at one end and an end cap assembly at the other end. Such air springs are used primarily for implementation in motor vehicles for supporting the vehicle body or for use in other types of equipment subject to shock to provide cushioning therefor. The air springs are sealed at the ends to form a pressurized fluid chamber within the bellows. Upon the air spring experiencing a road shock, the bellows will begin to collapse as the end members move toward each other, with one end of the bellows rolling along or over the sidewall of the bottom piston member to yield predictable dynamic characteristics. However, if the bellows of the air spring rolls over the bead plate at the opposite end instead of along the sidewall of the piston, the dynamic characteristics will be adversely effected. Also, the life of the air spring will be materially reduced.

The diameter of the piston is restricted by the diameter of the opposite end bead plate, and the larger the end bead plate, the more difficult it is to prevent the bellows from rolling over the edges of the plate, and in particular, the inturned peripheral clamping edge thereof. Therefore, to prevent this rollover effect, external rings or special mountings have heretofore been required to stabilize the air spring, which added to the cost and weight of the air spring. Other types of reinforcements use thicker rubber or additional rubber strips in the area of the bellows adjacent this end plate or end cap in order to stiffen this area to prevent end plate rollup.

In addition to the above-described prior art structures to eliminate end plate rollup, the following patents set forth below, disclose additional prior art of interest to the present invention.

U.S. Pat. No. 2,920,885 discloses a reinforcing air spring wherein the body includes reinforcing elements embedded in the walls which are anchored at the bead cores. The ends of the reinforcing elements are wrapped around the bead cores to form a double ply at each end. Such construction is not believed to prevent rollover at the ends of the bellows, but are used to enhance the strength characteristic at the bead area.

U.S. Pat. Nos. 2,996,103 and 3,666,598 show various types of apparatus for making air springs, neither of which disclose any particular construction for stiffening the area of the bellows adjacent the end bead thereof as does the present invention.

U.S Pat. No. 3,043,582 discloses a rolling lobe air spring wherein the layers of material are wrapped around the bead rings, but does not disclose any construction to prevent the bellows or membrane from rolling upwardly over the end plate.

U.S. Pat. No. 4,174,827 is an example of one of the prior art air springs which provides a collar or additional structural component external of the air spring, to prevent the bellows from rolling upwardly over the end ring or clamping plate.

U.S Pat. No. 4,763,883 discloses an air spring bellows construction wherein the bellows is formed of elastomeric material and reinforced with embedded fiber cords. Successive layers of cord are wound in annular bands, either in the rolling lobe or in the chamber portion, in combination with helical windings to change angles of the cord material.

U.S. Pat. No. 3,319,952 is believed to be one of the closest air spring construction to that of the present invention. This patent discloses reinforcing strips beneath the clamp area for reinforcing the clamp area, but does not show reinforcement located adjacent the clamped area in the body of the bellows to prevent the bellows from rolling over the clamped area at the end plate.

None of these prior art patents discussed above, disclose the present invention of stiffening one end of the bellows adjacent the end plate to sufficiently stiffen the bellow without materially adding to the weight thereof, to prevent rollup over the end plate.

SUMMARY OF THE INVENTION

Objectives of the invention include providing an improved air spring construction of the type having a pair of spaced end members, one of which usually is a piston and the other is an end plate, with a flexible elastomeric sleeve or bellows extending therebetween, in which the end of the bellows adjacent the end plate is reinforced with elastomeric coated fabric or cords to prevent rollup of the bellows over the end plate.

A still further objective of the invention is to provide such an improved air spring which eliminates external rings or special mounting components heretofore required to stabilize the air spring and keep the bellows from rolling over the end closure plate.

Still another objective is to provide such an air spring which provides increased stiffness in the sidewall of the bellows adjacent the end plate with a minimum amount of material, which will continue to function for the life of the air spring without taking a permanent set, and which does not materially effect the procedure and cost of air spring manufacture.

A still further objective of the invention is to provide such an air spring which allows for the use of larger diameter pistons on rolling lobe type air springs by enabling the diameter of the opposite end plate to be increased due to the elimination of bellows rollup over the end plate.

A still further objective of the invention is to provide such an improved air spring in which the reinforcement is provided by two strips of elastomeric coated reinforcing cords which are sandwiched between inner and outer reinforced body plies of the air spring and which extend a distance between two and six inches from adjacent the end plate toward the opposite piston.

Another objective of the invention is to provide such an improved air spring in which the angle of bias of the cords of the reinforcing strips are generally opposite with respect to each other and are opposite with respect to the angle of bias of the cords of the body ply of the adjacent reinforcing strip, and in which the angle of bias of the cords in the reinforcing strip is between 2° and 6° less than the angle of bias of the cords in the adjacent body plies.

These objectives and advantages are obtained by the improved air spring of the invention, the general nature of which may be stated as including an air spring of the type having an elastomeric bellows mounted on and extending between a pair of axially spaced end members wherein the bellows includes an inner body ply of elastomeric coated cords biased at a first angle with respect to the longitudinal axis of the bellows; an outer body ply of elastomeric coated cords biased at a second angle with respect to the longitudinal axis of the bellows; a first reinforcing strip of elastomeric coated cords laid adjacent the inner body ply, with the cords of said first strip biased in generally opposite directions to the angle of bias of the cords of said inner body ply, said first reinforcing ply extending from adjacent one of the end members toward the other end member a distance less than one-fourth the axial distance between the two end members: and a second reinforcing strip of elastomeric coated cords laid between the first reinforcing strip and the outer body ply, with the cords of said second strip biased in a generally opposite direction to the angle of bias of the cords of said outer body ply and in a generally opposite direction to the angle of the cords of said first reinforcing strip, and extending from adjacent said one end member for a distance generally equal to that of the first reinforcing strip.

BRIEF DESCRIPTION OF THE DRAWINGS

A preferred embodiment of the invention, illustrative of the best modes in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
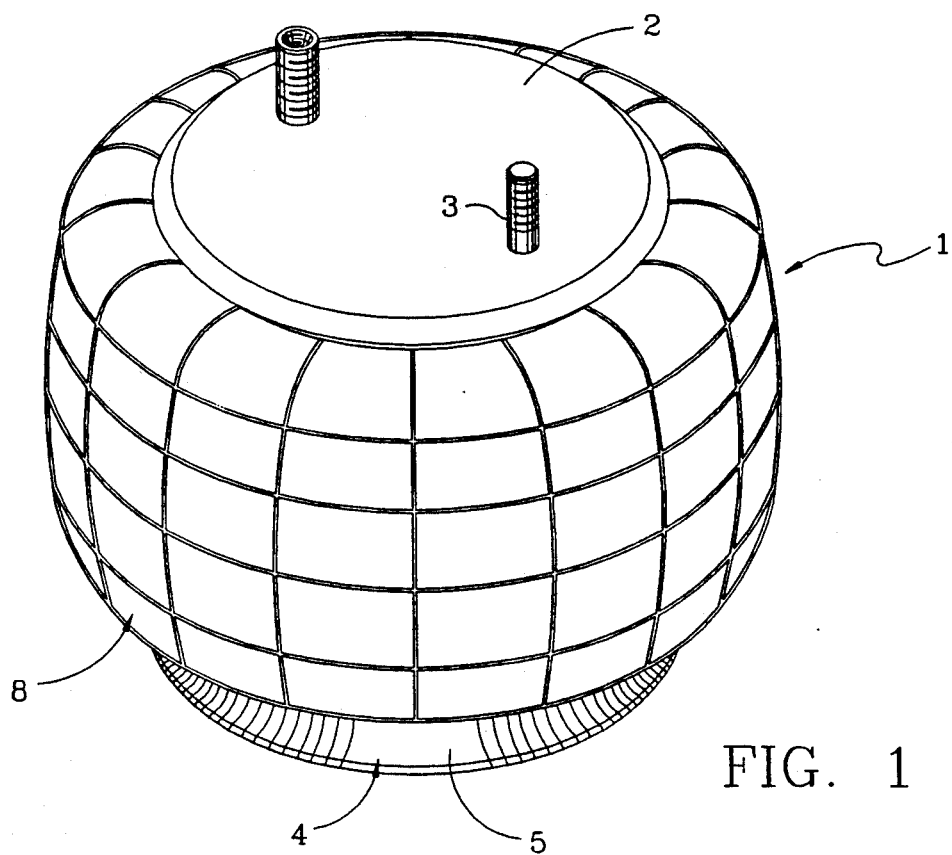
FIG. 1 is a perspective view of one type of air spring having the fabric reinforced stiffening strips incorporated therein.
Figure 2:
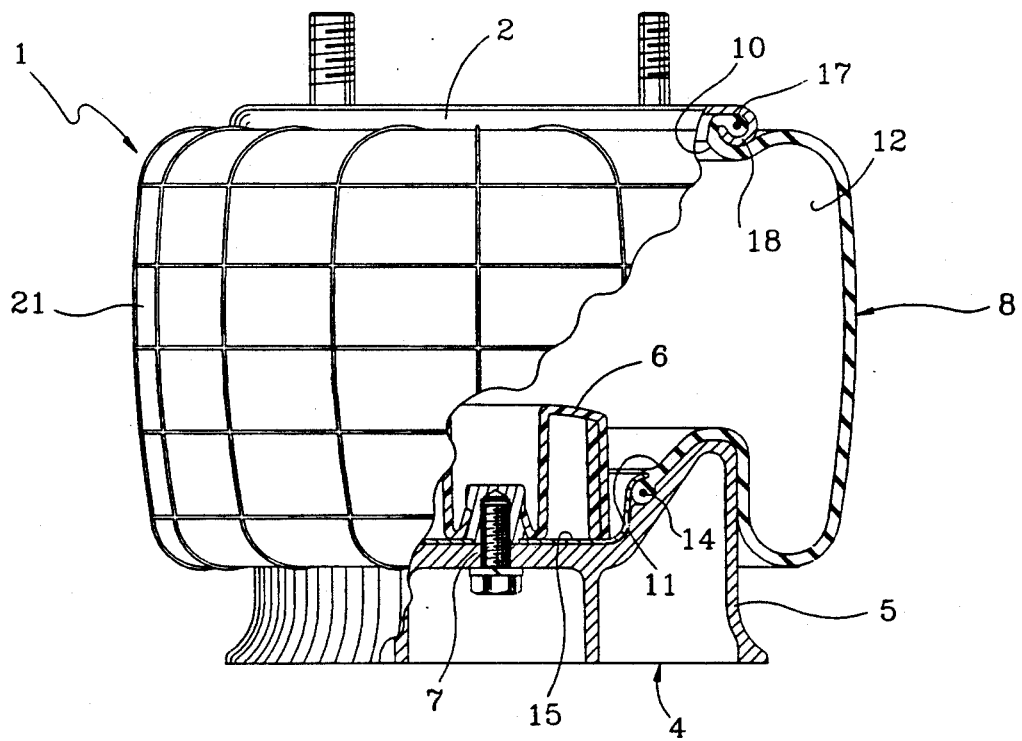
FIG. 2 is a side elevational view with portions broken away and in section, of the air spring of FIG. 1.

The improved fluid pressure device of the present invention is an air spring indicated generally at 1, and is shown particularly in FIGS. 1 and 2. Air spring 1 is of the usual construction having a top end plate 2 provided with a plurality of mounting studs 3 thereon for attaching it to a supporting structure. The lower portion of spring 1 includes a piston 4 which is adapted to be mounted on another supporting structure spaced generally axially from the supporting structure on which end plate 2 is attached. Piston 4 includes a combination cylindrical and conical shaped outer surface 5 and may have a resilient bumper 6 or the like mounted within the central portion of piston 4 by a mounting bolt 7. The constructions of piston 4 may vary without materially affecting the concept of the invention and that illustrated in FIG. 2 is merely one type with which the improved reinforced stiffener construction of the present invention may be utilized.

An elastomeric bellows or flexible sleeve indicated generally at 8, which is made in accordance with the novel features of the present invention, is mounted on and extends between end plate 2 and piston 4. Bellows 8 is formed with a pair of open ends 10 and 11 which are sealingly secured to end plate 2 and piston 4 respectively, to form an airtight fluid pressure chamber 12 therein. Bottom open end 11 of bellows 8 preferably is formed with an end bead 14 which is securely clamped in an airtight relationship by a clamping plate 15 associated with piston 4. Opposite open end 10 of bellows 8 also is provided with a stiffening end bead 17 which is secured in an airtight clamped relationship by a rolled end 18 of end plate 2. The particular construction of air spring 1, including bellows 8 and the open ends and termination of bellows 8, is common in the air spring art and is set forth for illustrative purposes only and may be varied without affecting the concept of the invention.

Figure 3:
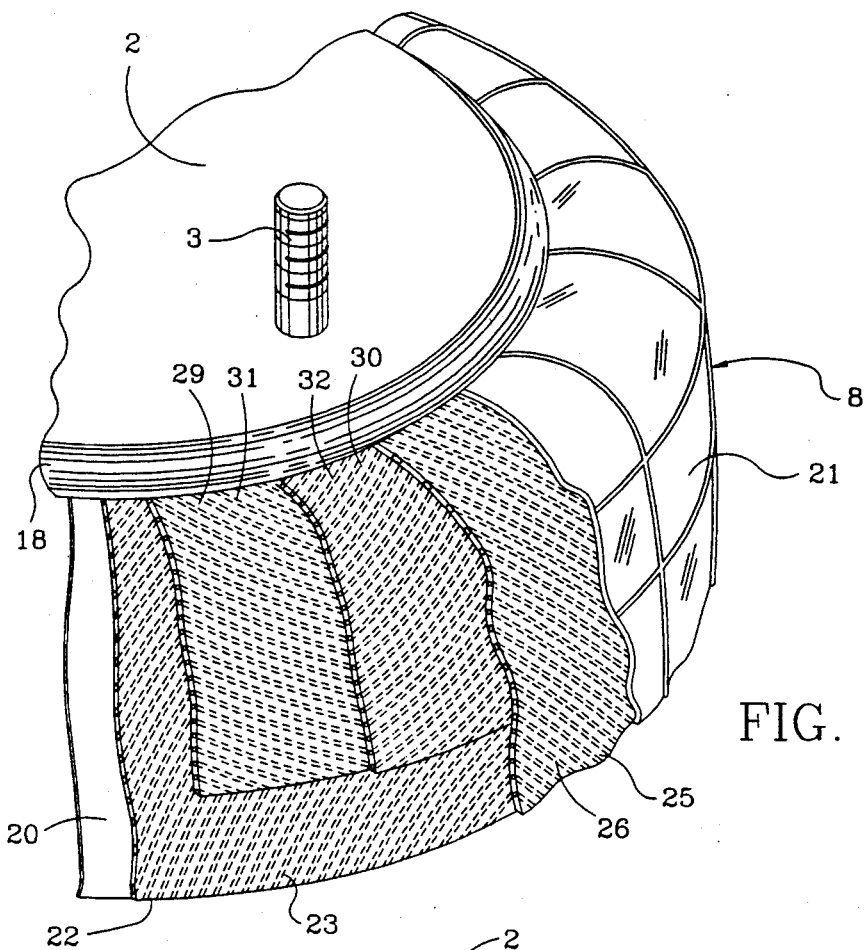
FIG. 3 is an enlarged fragmentary perspective view with portions broken away, showing the reinforcing strips and associated body plies of the air spring of FIGS. 1 and 2.

Referring particularly to FIG. 3, bellows 8 preferably has an innerliner of generally air impervious non-reinforced elastomeric material 20 and an outer cover 21 of similar non-reinforced elastomeric material, the latter providing good abrasion resistance and resistance to chemicals and the harsh environment to which it may be exposed.

In further accordance with a usual air spring construction, a first or inner body ply 22 is provided with a plurality of biased, equally spaced, parallel reinforcing cords 23 which are calendered or embedded within the rubber of ply 22. Heretofore, a second or inner reinforced body ply 25, containing similar biased reinforcing cords 26, was sandwiched between and bonded to outer cover sheet 21 and inner body ply 22. In this prior construction, the angle of bias of cords 23 and 26 were generally opposite to each other, with the preferred angle of bias being approximately 34 ¼°. This angle of bias is the angle which the parallel cords make with respect to the longitudinal axis of the building drum which becomes the longitudinal axis of the completed bellows 8.

Figure 4:
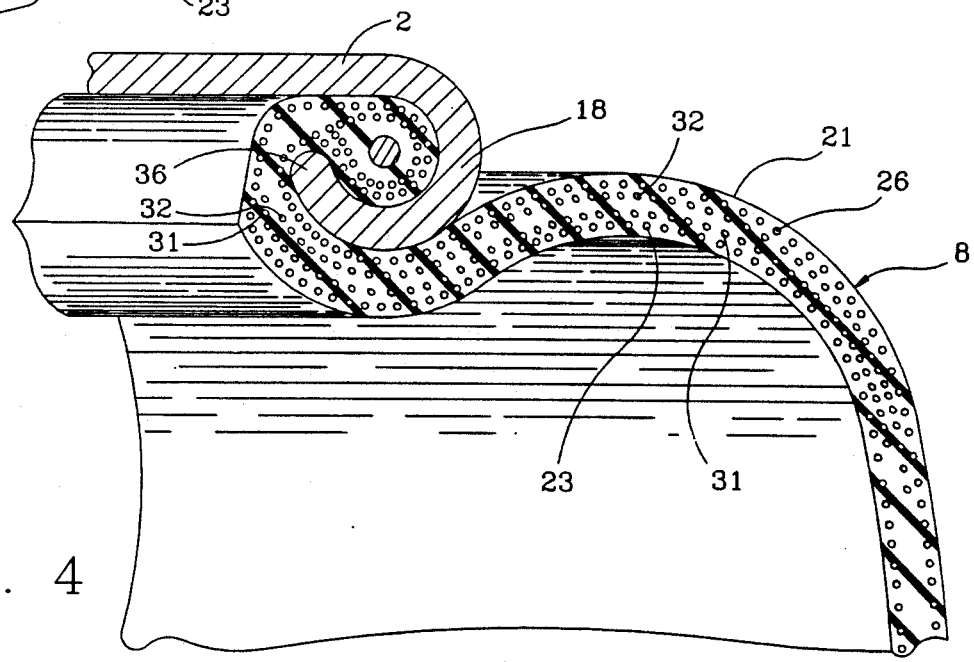
FIG. 4 is a greatly enlarged fragmentary sectional view showing the connection of the reinforced bellows with the end plate of the air spring.
Figure 5:
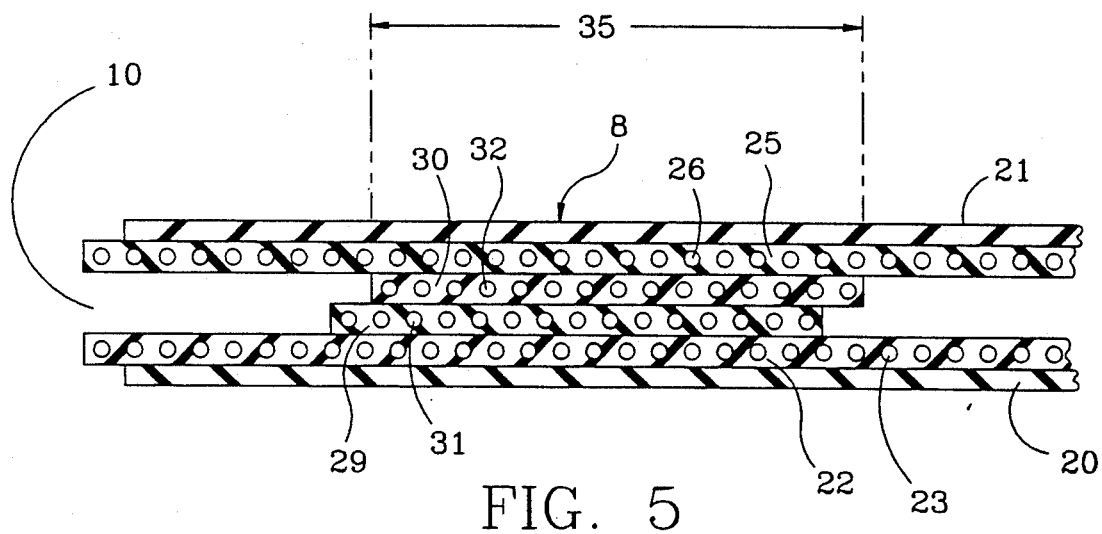
FIG. 5 is a greatly enlarged fragmentary sectional view showing the position of the various body plies and reinforcing strips at one end of the bellows.

In accordance with the present invention, best shown in FIGS. 3, 4 and 5, two layers of reinforcing plies or strips indicated at 29 and 30, containing spaced parallel reinforcing cords 31 and 32, respectively, are sandwiched between and bonded to inner and outer body plies 22 and 25 and extend a predetermined distance from adjacent open end 10 of bellows 8 axially along and circumferentially around the bellows.

In further accordance with the invention, the bias angles of cords 31 and 32 are in generally opposite directions with respect to each other. Also, the bias angle of cords 31 of inner reinforcing strip 29 is such so that the cords lie in generally opposite directions to the direction of reinforcing cords 23 of inner body ply 22 (FIG. 3). Likewise, cords 32 of outer reinforcing strip 30 lie in generally opposite direction to the bias angle of cords 26 of outer body ply 25.

Furthermore, it has been determined that the best results are obtained by biasing the angles of the cords in reinforcing strips 29 and 30 at an angle less than the angle of bias of the cords of inner and outer body plys 22 and 25 within the range between 2° and 6°, with the preferred difference being 3°. Thus, in the preferred embodiment the angle of bias of cords 31 and 32 of reinforcing strips 29 and 30 will be at 31½ or 3° less than the preferred angle of bias of body ply cords 23 and 26 which is 34½°. However for large diameter bellows the angle of bias of cords 23 and 26 may be 28°. Again, the angle of bias is with respect to the longitudinal axis of the building drum and bellows formed thereon.

The angle of bias is in reference to the angle that the cords lie in the various strips when in an unvulcanized or green state when placed on the building drum prior to vulcanizing in a cure press. This enables the starting bias to be accurately controlled since, depending upon the size of the final vulcanized bellows, the final bias angle of the various cords may vary from their starting angle due to expansion of the green bellows within the curing press. For example, for certain size bellows, a starting bias angle of 34 ½ may be 40° plus or minus several degrees after curing due to expansion of the green bellows and the spreading action of the internal cords during expansion. Thus the bias angle as used throughout refers to the angle of the cords in a green bellows prior to vulcanization.

It also has been determined that the width or axial length of reinforcing strips 29 and 30 as shown at 35 in FIG. 5, is approximately 2 inches. However this width can vary depending upon the overall axial length and diameter of the particular bellows 8 used for a particular air spring construction. However, for most air springs, the axial length or width 35 of the reinforcing strips will be between 2 inches and 6 inches, preferably less than ¼ the axial distance between end plate 2 and piston 4.

In further accordance with the invention, when the various reinforcing strips and body plies forming bellows 8, are layed up on a building drum prior to vulcanization, as best shown in FIG. 5 in exaggerated condition, reinforcing strips 29 and 30 will be spaced inwardly from the outer ends of the inner and outer body plies 22 and 25, a sufficient distance so that when open end 10 of bellows 8 is clamped by rolled end 18 of end plate 2, as shown in FIG. 4, reinforcing cords 23 and 26 of the inner and outer body plies will be trapped within the rolled edge of end plate 2. However, cords 31 and 32 of reinforcing strips 29 and 30, will terminate generally adjacent the outer terminal end 36 of rolled end 18 so as not to extend beyond end 36 and into rolled edge 18 as do cords 23 and 26.

It has been determined that the particular bellows construction having the particular characteristics of the angles of cord biasing, width and position of the reinforcing ply strips, provide extremely satisfactory results. However, for certain applications the various angles of bias and width of the reinforcing strips may vary without materially affecting the results achieved thereby. However, for most applications, the angle of bias of the cords in the body plys will be 34½° with the angle of bias of the cords in the reinforcing strips being 31½°, and the reinforcing strips will have a width of approximately 2 inches. Also, as shown in FIG. 5, the ends of the reinforcing strips will be slightly offset with respect to each other. Also, the ends of inner liner 20 and outer cover sheet 21 do not align with the terminal ends of body ply strips 22 and 25, to provide for a smoother transition between the various strips when the bellows is assembled in final form than would occur if the various terminal ends were exactly aligned with each other. However, as discussed previously above, the terminal ends of reinforcing strips 29 and 30 are spaced inwardly from the outer ends of the body ply strips so as not to extend into the rolled end of the top bead clamping plate.

Although the above description is in reference to an air spring having an end cap at one end and a piston at the opposite end, the principles of the present invention are applicable to a convoluted air spring in which end plates are used at both ends without any piston.

Accordingly, the improved air spring or fluid pressure device of the invention, and in particular, the fabric reinforced stiffeners therefor, eliminates the need for external rings and special mountings heretofore required to stabilize the air spring and to keep the bellows from rolling over the bead end plate, without materially adding to the weight and thickness of the air spring of the bellows, by providing an increased stiffness with less material. These reinforcing strips will continue to function for the life of the air spring without taking a permanent set and do not appreciably affect the manufacture of the finished air spring.

Also, the various reinforcing cords, preferably are formed of the same material for both the body plys as well as for the reinforcing strips, such as nylon, polyester or similar materials currently used for such air spring constructions. This facilitates the manufacture of these reinforcing strips with the main difference being that the angle of bias of the cords are at different angles than in the body plies.

Accordingly, the improved air spring of the present invention is simplified, provides an effective, safe, inexpensive, and efficient device which achieves all the enumerated objectives, provides for eliminating difficulties encountered with prior art devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved air spring is constructed and used, the characteristics of the construction, and the advantageous, new and useful results obtained; the new and useful structures, devices, elements, arrangements, parts and combinations, are set forth in the appended claims.

We claim:

1. An air spring of the type having an elastomeric bellows mounted on and extending between a pair of axially spaced end members, said bellows including:
   an inner body ply of elastomeric coated cords biased at a first angle with respect to the longitudinal axis of the bellows;
   an outer body ply of elastomeric coated cords biased at a second angle with respect to the longitudinal axis of the bellows;
   clamp means for sealingly clamping the inner and outer body plies against one of the end members;
   a first reinforcing strip of elastomeric coated cords bonded to the inner body ply with the cords of said first strip biased in a generally opposite direction to the angle of bias of the cords of said inner body ply, said first reinforcing strip extending from adjacent the clamp means of said one end member toward the opposite end member a distance less than one-fourth the axial distance between the two end members; and a second reinforcing strip of elastomeric coated cords bonded between the first reinforcing strip and the outer body ply, with the cords of said second strip biased in a generally opposite direction to the angle of the cords of said outer body ply and in a generally opposite direction to the angle of bias of the cords of said first reinforcing strip and extending from adjacent the clamp means of said one end member for a distance generally equal to that of the first reinforcing strip.

2. The air spring defined in claim 1 in which the first and second reinforcing strips extend a distance of between 2 inches and 6 inches from adjacent the clamp means of the said one end member.

3. The air spring in claim 1 in which the cords of the inner and outer body plys are biased at angles of approximately $34\frac{1}{2}°$ and in opposite directions with respect to each other.

4. The air spring defined in claim 1 in which the cords of the first and second reinforcing strips are biased at generally the same angle but in opposite directions with respect to each other.

5. The air spring defined in claim 1 in which the cords of the first reinforcing strip are biased at an angle of between 2° and 6° less than the angle of bias of the cords of the inner body ply.

6. The air spring defined in claim 1 in which the cords of the second reinforcing strip are biased at an angle of between 2° and 6° less than the angle of bias of the cords of outer body ply.

7. The air spring defined in claim 1 in which the said one end member is a plate having a peripheral rolled edge which provides the clamp means; in which the bellows has a pair of open ends, one of which is clamped and sealed within the rolled edge of the plate; and in which the first and second reinforcing strips terminate within the body plies of the bellows a spaced distance from the said one open end thereof so as to terminate outside of the rolled edge of said plate.

8. The air spring defined in claim 7 in which the cords of the inner and outer body plies extend to the said one open end of the bellows and are trapped within the rolled edge of the plate.

9. The air spring defined in claim 7 in which the cords of the reinforcing strips extend to generally adjacent the rolled edge of the plate.

10. The air spring defined in claim 1 in which the cords of the first and second reinforcing strips and of the inner and outer body plies are formed of the same material.

11. The air spring defined in claim 1 in which one of the end members is a piston.

12. The air spring defined in claim 1 in which an innerliner of an air impervious elastomeric material is bonded to the inner body ply.

13. The air spring defined in claim 1 in which an outer layer of abrasive resistant elastomeric material is bonded to the outer body ply.

14. The air spring defined in claim 1 in which the first and second reinforcing strips each have a width of approximately 2 inches.

15. The air spring defined in claim 1 in which the first and second reinforcing strips each have a width of between 2 inches and 6 inches.

16. An improved fluid pressure device of the type having a flexible elastomeric sleeve mounted on and extending between a pair of axially spaced end members, wherein said sleeve includes an inner body ply of elastomeric coated cords biased at a first angle, and a outer body poly of elastomeric coated cords biased at a second angle generally opposite to the angle of bias of the cords of the inner body ply; wherein said improvement includes a first reinforcing strip of elastomeric coated cords adjacent to the inner body ply with the cords of said first strip biased in a generally opposite direction to the angle of the cords of said inner body ply; and a second reinforcing strip of elastometric coated cords located between the first reinforcing strip and the outer body ply, with the cords of said second strip biased in a generally opposite direction to the angle of the cords of first reinforcing strip; clamp means for sealingly clamping the inner and outer body plies against one of said end members, said reinforcing strips extending from adjacent to and outside of the clamp means of said one end member for a distance of between 2 inches and 6 inches toward the other end member.

* * * * *